United States Patent [19]

Kuroda

[11] 4,371,798
[45] Feb. 1, 1983

[54] MAGNETIC CYLINDER

[76] Inventor: Takeshi Kuroda, 7-12, Higashishioya-cho, Kure-shi, Hiroshima-ken, Japan

[21] Appl. No.: 131,469

[22] Filed: Mar. 18, 1980

[30] Foreign Application Priority Data

Mar. 26, 1979 [JP] Japan .................................. 54-36136
Jun. 30, 1979 [JP] Japan ............................. 54-90443[U]

[51] Int. Cl.³ .............................................. H02K 7/06
[52] U.S. Cl. ....................................... 310/80; 310/103
[58] Field of Search ................................. 310/80, 103

[56] References Cited

U.S. PATENT DOCUMENTS

| | | | |
|---|---|---|---|
| 2,745,027 | 5/1956 | Williford, Jr. ....................... | 310/103 |
| 2,790,095 | 4/1957 | Peek et al. ............................ | 310/103 |
| 2,943,216 | 6/1960 | Spodig .................................. | 310/103 |
| 3,328,615 | 6/1967 | Bakker et al. ........................ | 310/80 |
| 3,438,412 | 12/1969 | Bakker et al. ........................ | 310/103 |
| 4,011,477 | 3/1977 | Scholin ................................. | 310/80 |
| 4,196,365 | 4/1980 | Presley .............................. | 310/103 X |

*Primary Examiner*—Donovan F. Duggan
*Attorney, Agent, or Firm*—Kane, Dalsimer, Kane, Sullivan & Kurucz

[57] ABSTRACT

A magnetic cylinder has at least one magnet unit on the movable side and at least one magnet unit on the stationary side. Each unit on any such side consists of a plurality of magnets as are set to result in the positive and negative magnetic poles to alternate equiangularly in the peripheral direction of the cylinder. A piston rod and a maneuvering mechanism are operatively connected to the at least one magnet unit on the movable side in such a manner that the at least one magnet unit on the movable side may be rotationally rocked by means of the maneuvering mechanism so that by the thusly shifted attracting or repelling action between both the said magnet units the piston rod is caused to reciprocatingly move to and for in the axial direction of the cylinder.

7 Claims, 6 Drawing Figures

Fig. 3
Fig. 4
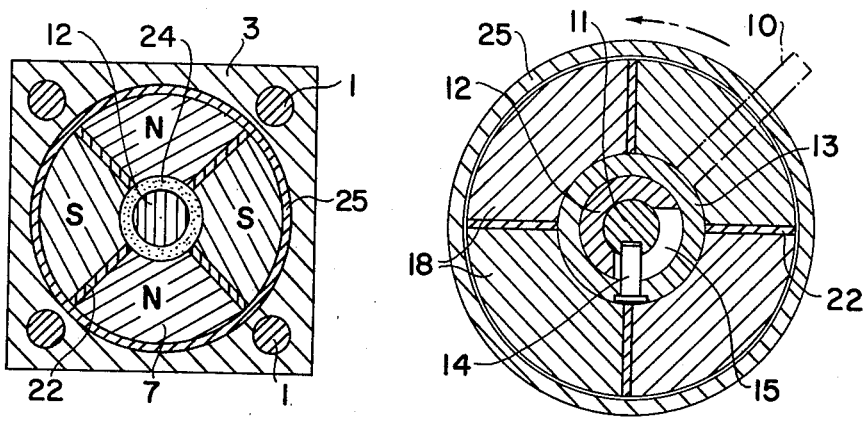
Fig. 5A
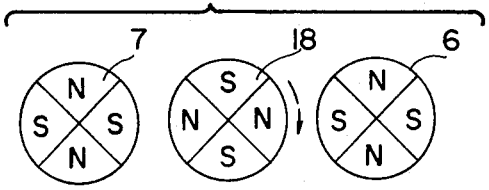
Fig. 5B
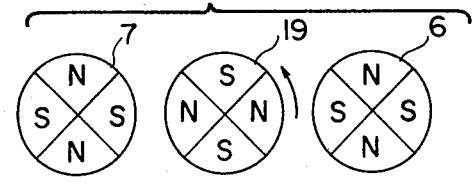
Fig. 6
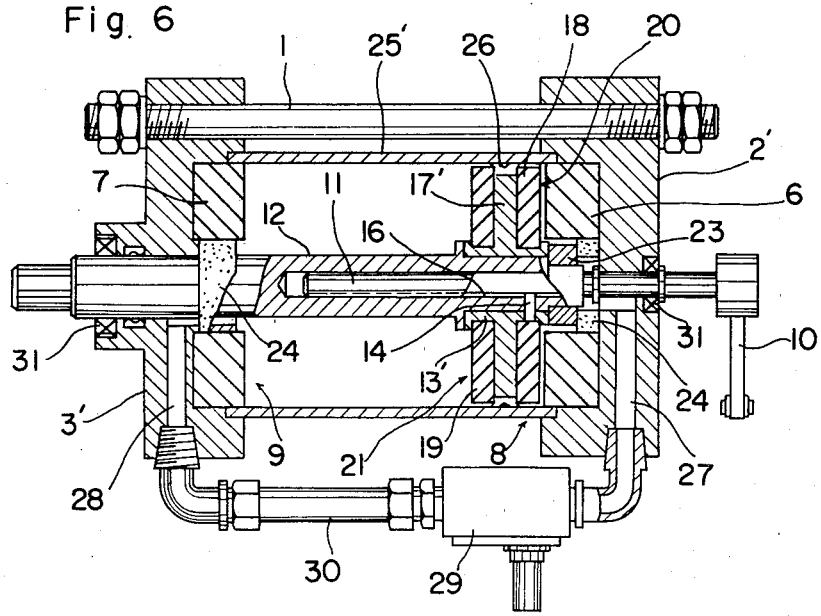

MAGNETIC CYLINDER

BACKGROUND OF THE INVENTION

This invention relates to a magnetic cylinder having a piston adapted to magnetically be actuated.

It is conventional for driving machinery to use an actuator adapted to work by actuation of the piston, for instance a pneumatic cylinder as is operated by introducing compressed air from an air compressor for actuating the piston. Use of such pneumatic cylinder makes, however, the entire installation complicated, since it requires, besides the compressor, piping and valving means between the compressor and the pneumatic cylinder, and it naturally requires proper gas-tightness between the cylinder inner wall and the piston to slide therealong in actuation movement, in order to prevent failure of the pneumatic actuation or leakage of the actuation medium. The same applies as a matter of course also to a hydraulic cylinder.

SUMMARY OF THE INVENTION

This invention has as its object to provide a magnetic cylinder based on the principle fundamentally different from that of the said conventional actuators, in order to eliminate their drawbacks as mentioned above.

A piston-cylinder assembly is provided including a slidably mounted piston rod; a first magnetic unit mounted to said piston rod so as to be axially movable therewith, said magnetic unit including a plurality of segments of alternating polarity in the direction of rotation about the axis of the piston rod; means for rotationally moving the first magnetic unit with respect to the axis of the piston rod; and a second fixedly mounted magnetic unit, said second magnetic unit opposing said first magnetic unit and including a plurality of segments of alternating polarity in the direction of rotation about the axis of the piston rod, the first and second magnetic units disposed such that they will attract or repel each other, thereby causing linear movement of the piston rod, when the means for rotationally moving the first magnetic unit is actuated.

A third fixedly mounted magnetic unit may be provided along the same axis as the first and second magnetic units. The first magnetic unit is positioned between the second and third units.

The first magnetic unit may be arranged to move within a gas-tight cylinder controlled by flow regulation means. The gas-tight cylinder may be filled with a substantially incompressible or a compressible fluid.

It has further been made possible to rotationally rock the shaft by moderate input, making use of the physical principle that a pair of flat magnets in close attraction to each other may lightly slide along the mutual adhereing contact surface upon slight external force, to thereby obtain large output.

Other objects and advantages will further be apparent from the detailed description now to follow:

BRIEF DESCRIPTION OF THE DRAWINGS

In the drawings, FIGS. 1-5 are for illustrating a first embodiment of the magnetic cylinder according to this invention, more particularly FIG. 1 is a longitudinal sectional view of the overall cylinder FIG. 2 is an enlarged view of a portion of FIG. 1, FIGS. 3 and 4 are sectional views taken on lines A—A and B—B, respectively, and FIGS. 5A and 5B are schematic views or sketches to explain the action of the apparatus, while FIG. 6 is a sectional view similar to FIG. 1 but is here for a second embodiment of the cylinder.

DETAILED DESCRIPTION OF THE PREFERRED EMBODIMENTS

Figure 1:
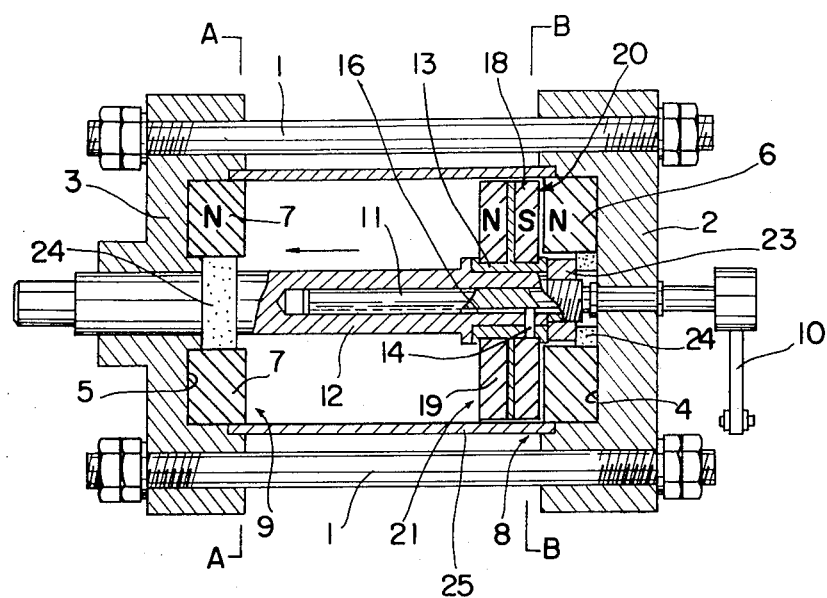
Figure 2:
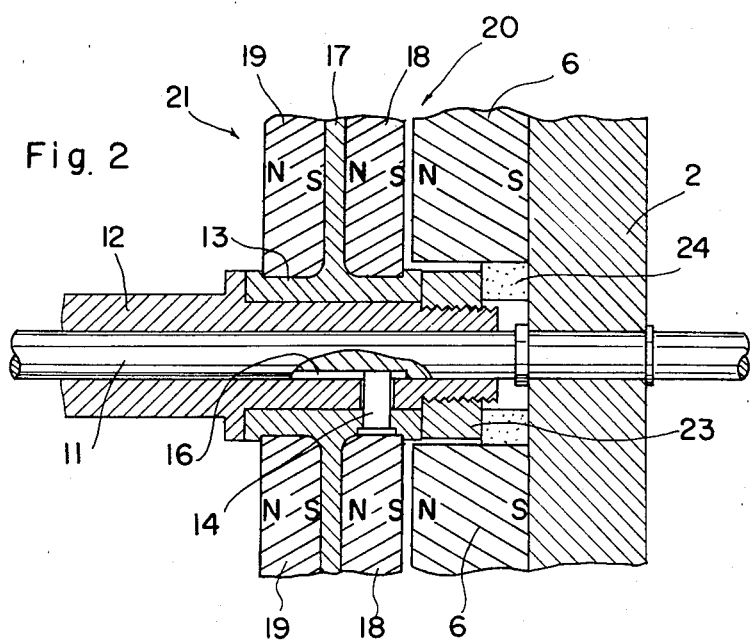

Describing hereunder a first embodiment of this invention with reference to FIGS. 1-5A,5B, in a head cover (2) and a rod cover (3), as are mounted by screwing on both ends of bolts (1), respectively, there are defined respective recesses (4),(5) on the inner sides thereof, and in each of the recesses (4),(5) there are disposed (see FIG. 3) four permanent magnets (6) respectively (7) in fan shape of equal size to one another, in doughnut-like form with the positive and negative magnetic poles in alternation. Two stationary magnetic units, designated by numerals (8) and (9), are accordingly provided. Both units (8),(9) thusly provided in opposition on both sides as seen in FIG. 1 are set to have their magnetic poles of the constituent magnets (6),(7) the same as each other. On the head cover (2) there further is rotatably journaled a shaft (11) which is connected, via an arm (10) fixed to an end thereof, to a non-illustrated driving segment. In the rod cover (3) there is slidably journaled a piston rod (12) which is mounted rotationally rockably and slidably on to the said shaft (11) and of which one end is connected to a non-illustrated driven segment, while a magnet holder (13) is mounted to the other end rotationally rockably relative thereto. With a pin (14) inserted from said magnet holder (13) to engage, passing through a groove (15) (see FIG. 4) in the peripheral direction formed in the said piston rod (12), with a key groove (16) in the said shaft (11); the said magnet holder (13) is made capable of sliding, together with the piston rod (12), in the axial direction of the shaft (11), and simultaneously the shaft (11) is made capable of rockingly rotating by 90° within the range of the groove (15) as well as of sliding in the axial direction. The magnet holder (13) has an annular disc (17) as is formed integrally therewith, and on both sides of the disc (17) there are secured permanent magnets (18),(19), respectively. The magnets (18), as well as (19), are just like the magnets (6),(7) mounted on the inner side of the head cover (2) and rod cover (3), respectively. The respective four magnets in fan shape of equal size to one another are disposed in doughnut-like form with the positive and negative magnetic poles angularly in alternation. In other words, each magnet (18), (19) includes a plurality of segments of alternating polarity, the segments of magnet (19) opposing segments of magnet (18) of opposite polarity, and separated by the annular disc (17). This construction thereby provides two magnetic units designated by numerals (20) and (21) movable axially with the piston rod. In the drawings, designated at (22) are frames partitioning the said magnets (6),(7),(18),(19), as are formed of non-magnetic material; at (23) is a nut for clamping the magnet holder (13) on to the rod (12); and at (24) is a stopper rubber for buffering any shocking force at the time of attractive colliding together of the magnets (6) and (18), or (7) and (19), as the case may be, in actuation of the piston rod (12). Furthermore, at (25) is a hollow cylindrical body as is bridgingly fitted over the said rod cover and head cover, and is supposed to be made of magnetic material as iron plate or the like thus to function as magnetic shielding means. It also has the function of supporting the magnet units (20),(21) at the place intermediary of both the magnet units (8),(9), thus the place where the magnetic action is weakest.

To describe now hereunder how this apparatus operates, supposing that the magnets (18) of the magnet unit (20) mounted on the piston rod (12) are each in the attractive adhering state with the magnets (6) of the magnet unit (8) mounted within the head cover (2), as shown in FIG. 1, and that in such state the shaft (11) is rockingly actuated so as to rotate by 90° (see FIG. 5A), then magnetic poles of the opposed magnets (6),(18) are brought to be identical and by their repelling force the piston rod (12) is displaced in the direction of the arrow in FIG. 1. Since the constituent magnets (18),(19) of the magnet units (20),(21) on the piston rod (12) have their magnetic poles opposite on the head cover side as compared to the counterparts on the rod cover side, it then results on the other hand that the magnets (19) come to be in mutual attraction with the magnets (7) on the side facing the rod cover (3) and thereby further enhance the axial movement of the piston rod (12). Output is thus given to the driven segment.

When retracting the piston rod (12) from the state of the attracting adherance of the magnets (19) of the magnet unit (21) with the magnets (7) of the magnet unit (9) on the side facing the rod cover (3), it is possible either by further rotating the shaft (11) by another 90° or by rotating same back to return to the original position (see FIG. 5B). The piston rod (12) is thus caused to move in a direction opposite to that mentioned before.

Though the magnets (6),(7),(18),(19) are each in equiangularly divided four-segment construction in the specific embodiment illustrated and described hereinabove, it is as well possible to construct them each in any even-number-segment construction, thus with the segment number of two or more. As larger segment number is adopted, the angle of each actuating rotation of the shaft (11) decreases in inverse proportion thereto. Furthermore, it is obvious that each constituent magnet may as well further be in arbitrarily divided segment construction, so long as they are in identical magnet poles.

Still further, though the magnet units (8),(9) have been mounted on the head cover (2) and the rod cover (3), respectively, it is as well possible, in the case the stroke of the piston rod (12) is comparatively short, to mount a magnet unit only on to either one of the head cover (2) and the rod cover (3). In such case, the other cover is formed of non-magnetic material. By the way, it is of course possible by forming the head cover (2) and the rod cover (3), on to which normally magnets are mounted, of magnetic material, to realize magnetic shielding, the same as was mentioned with respect to the cylindrical body (25), and to enhance the magnetic action of the magnets.

Just similarly, it is of no absolute necessity to provide both of the magnet units (20),(21), thus it is as well possible to provide only one of them.

Supposing still further the case of providing the cylindrical body (25) as in the specific embodiment mentioned above, it is preferable, in order to cause smooth movement of the piston rod (12), to provide air vent(s) on the said cylindrical body (25).

Describing now a second embodiment of this invention with reference to FIG. 6 in which like parts are designated by like reference numerals as in the first embodiment and no repetitious description of such parts is given, the second embodiment differs from the first embodiment in essence in that a hollow cylindrical body (25') is made in tight sealing type to gas-tightly engage with both end magnet units (8),(9) side and further that an annular disc (17') formed integrally with a magnet holder (13') is made to have sufficient diameter (smaller than the diameter of the magnetic disks (18), (19) so that a ring gasket (26) or piston ring means may be held on the periphery thereof in the recess formed between the two magnetic disks (18), (19) and disk (17') to establish proper gas-tightness also between the cylindrical body (25') inner surface and the disc (17') periphery. In head cover (2') and rod cover (3') there are defined respective ports (27),(28) communicating to the sealed inner space of the cylinder, and piping means (30) with a flow regulation valve (29) interposed in an intermediary portion thereof interconnects both of the ports (27),(28). Designated at (31) are seal rings.

The cylinder of the second embodiment with the structure as above operates in a manner also similar to that in the first embodiment, the essential difference being only in that it is here possible to control the piston rod (12) speed by adjusting fluid flow rate passing through said piping means (30) by means of operating the flow regulation valve (29). Either stepwise or stepless speed changing is possible by using either the stepwise or stepless regulation valve (29). The magnetic cylinder may find substantially enlarged field of application with such piston rod (12) speed control possibility.

The fluid filled within the sealed cylinder is preferably a substantially incompressible fluid as oil, water or the like, in the viewpoint of the speed control, but it may as well be a compressible fluid as air or the like. The use of compressible fluid leads to buffering the shocking force at the time the magnet units (20),(21) collide in attraction with the magnet units (8),(9).

As described above, a ring gasket (26) is fitted on the periphery of the disc (17') in the specific embodiment illustrated in FIG. 6, but the gasket (26) is of no absolute necessity, the operation of the cylinder being actually little affected even when there be some clearance between the cylindrical body (25') inner surface and the disc (17') periphery to allow fluid leakage therethrough.

The manner how to provide said piping means (30) with the regulation valve (29) is by no means limited to that shown specifically as above, thus to provide them outside the cylindrical body (25'). Namely, it is as well possible to form up any proper member, such for instance as the magnet holder (13'), with a through bore having both axial ends opening to the respective end portions of the sealed inner space of the cylinder, and to provide a flow regulation valve as interposed in an intermediary portion of the through bore, which valve may as well be embedded within such magnet holder (13') or the like.

I claim:
1. A piston assembly comprising:
   a slidably mounted piston rod;
   a first magnetic unit mounted to said piston rod so as to be axially movable therewith, said magnetic unit including a plurality of segments of alternating polarity in the direction of rotation about the axis of said piston rod;
   means for rotationally moving said first magnetic unit with respect to the axis of said piston rod; and
   a second fixedly mounted magnetic unit, said second magnetic unit opposing said first magnetic unit and including a plurality of segments of alternating polarity in the direction of rotation about the axis of said piston rod, said first and second magnetic units disposed such that they will attract or repel each other, thereby causing linear movement of said piston rod, when said first magnetic unit is rotated into a selected position.

2. A piston assembly as defined in claim 1 including a third fixedly mounted magnetic unit, said first, second, and third mounted units being mounted along the same axis, said first magnetic unit being positioned between said second and third magnetic units, said third magnetic unit including a plurality of segments of alternating polarity in the direction of rotation about the axis of said piston rod.

3. A magnetic cylinder as defined in claim 2 further including a tubular body bridging said second and third magnetic units and in sealing gas-tight contact therewith; first and second ports communicating with the interior of said tubular body on opposite sides, respectively, of said first magnetic unit; pipe means interconnecting said ports; and a flow regulation valve positioned within said pipe means, said flow regulation valve capable of controlling the speed of said piston rod by adjusting the fluid flow rate through said pipe means.

4. A magnetic cylinder as defined in claims 1, 2 or 3 wherein said means for rotationally moving said first magnetic unit comprises a shaft positioned within an axial center bore defined in said piston rod, said shaft being slidable and rotationally movable therein; a peripheral groove defined in said piston rod; and a pin passing through said peripheral groove, one end of said pin engaging said first magnetic unit, the other end of said pin fitted within an axially extending key groove defined in said shaft.

5. A magnetic cylinder as defined in claim 3 wherein said tubular body is filled with a substantially incompressible fluid.

6. A magnetic cylinder as defined in claim 3 wherein said tubular body is filled with a compressible fluid.

7. A magnetic cylinder as defined in claim 1 wherein said first magnetic unit includes a pair of doughnut-shaped magnets separated by a disc, each of said magnets including a plurality of magnet segments of alternating polarity in the direction of rotation about the axis of said piston rod, the magnet segments of one of said pair of magnets opposing magnet segments of opposite polarity of the other of said pair of magnets.

* * * * *